June 13, 1933.  M. E. MOELLER  1,913,559
METHOD AND APPARATUS FOR MOLDING THERMOMETER STEMS
Filed March 29, 1930  2 Sheets-Sheet 1

Inventor
Max E. Moeller
By his Attorney S. J. Cox

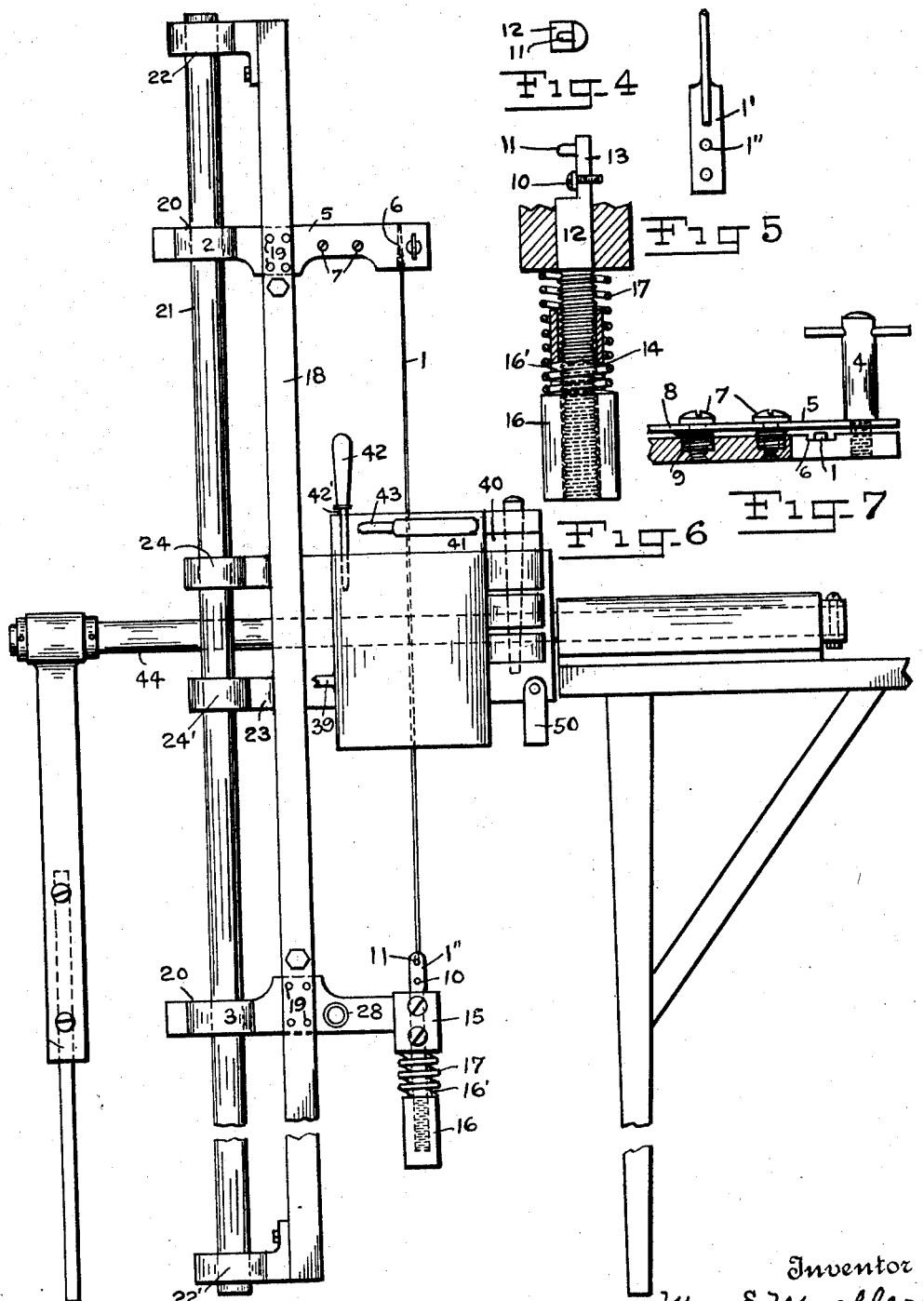

Patented June 13, 1933

1,913,559

UNITED STATES PATENT OFFICE

MAX E. MOELLER, OF BROOKLYN, NEW YORK, ASSIGNOR TO MOELLER INSTRUMENT COMPANY, INC., OF BROOKLYN, NEW YORK, A CORPORATION OF NEW YORK

METHOD AND APPARATUS FOR MOLDING THERMOMETER STEMS

Application filed March 29, 1930. Serial No. 439,865.

The improvements relate primarily to the manufacture of glass thermometer tubes by first molding a thick block or blank of glass with a bore therein, and then drawing it to the desired length and greatly reduced diameter, but they may be employed for any other purposes to which they may be adapted.

The present improvements may be regarded as in the nature of a modification or improvement in part of the method or process described and illustrated in my Patent No. 1,753,801, granted April 8, 1930, on a copending application and the description hereof in part as a further exposition of that method such as will enable others skilled in the art to more easily and with greater facility practice it. The present application is therefore partly a division and continuation of that application, to which reference is made for a description of such steps, if any, in the process, as may not be herein fully or specifically set forth.

The difficulties in producing glass thermometer stems with a bore of uniform cross-sectional area throughout have long been recognized, and efforts to overcome them have been made for very many years, but without complete success. This is due principally to certain obstacles encountered in the drawing and blowing method of producing them heretofore practiced. These difficulties will be understood when it is recalled that a mass of molten glass very many times the diameter of the finished thermometer stem and only a small fraction of the length of said finished stem is taken, and drawn while being blown to form the bore, and that the hairlike bore ultimately produced has but a very small fraction of the diameter of the stem. Therefore, in producing thermometer stems by these well known methods, even when the bore is round or elliptical in shape, the greatest skill and care are required to produce even approximately accurate results. Moreover, the difficulties are greatly increased, and rendered almost, if not quite insurmountable, if the bore is to have an angular segmental or other cross section having one or more of its walls accurately positioned. It will be seen that only by forming the initial bore of relatively great diameter in the original mass of molten glass and accurate in its size, shape and position, can satisfactory results be attained.

One of the important objects of the present improvements is to insure this accuracy in the size, shape and position of the original bore and to fix these characteristics so that when the original mass or block is drawn to great length, it will be maintained and will be present in the final stem. Other objects and advantages will be apparent to those skilled in the art.

In carrying out the present improvements a molding apparatus is preferably employed in which the initial mass or block of molten glass is molded with a movable rod, of the desired shape and placed in the desired position relative to the circumference, as a core to form the bore. The molding is also preferably accomplished by means of a mold in two or more parts, each part receiving and forming a segment or sector of the block to be molded, and these mold parts arranged to be closed so that the segments are brought together to form the complete block. This is done while the glass is still heated to a high temperature, sufficient to maintain it in a plastic state, the rod forming the core also being heated. The rod is then reciprocated until the segments of the block have united or fused together, and the glass has closed upon it so as to be in contact therewith throughout its entire circumference and the length in the block, and until the glass has cooled slightly, and to a sufficient extent to insure that the bore formed therein by the rod will not close or lose the shape given it by the rod, when the rod is removed. Experiment and test and careful measurements under various conditions and with the variations in the glass used will determine this, and tell the operator when the core rod may be removed. A practical method, however, with glass at the normal drawing temperature is to reciprocate the rod slowly through the bore ten to fifteen times and for a period of from one-half to one minute before removing it. Where a round bore is formed the rod may also be rotated, if desired.

An apparatus embodying the structural improvements and adapted to carry out the method herein described and claimed, is illustrated in the accompanying drawings, in which—

Figure 3 is a view similar to Fig. 1, of the apparatus with the mold and parts connected to swing therewith in vertical position, the mold being closed;

Figures 4, 5, 6 and 7 are details enlarged of the core rod and its connections.

Figure 1:
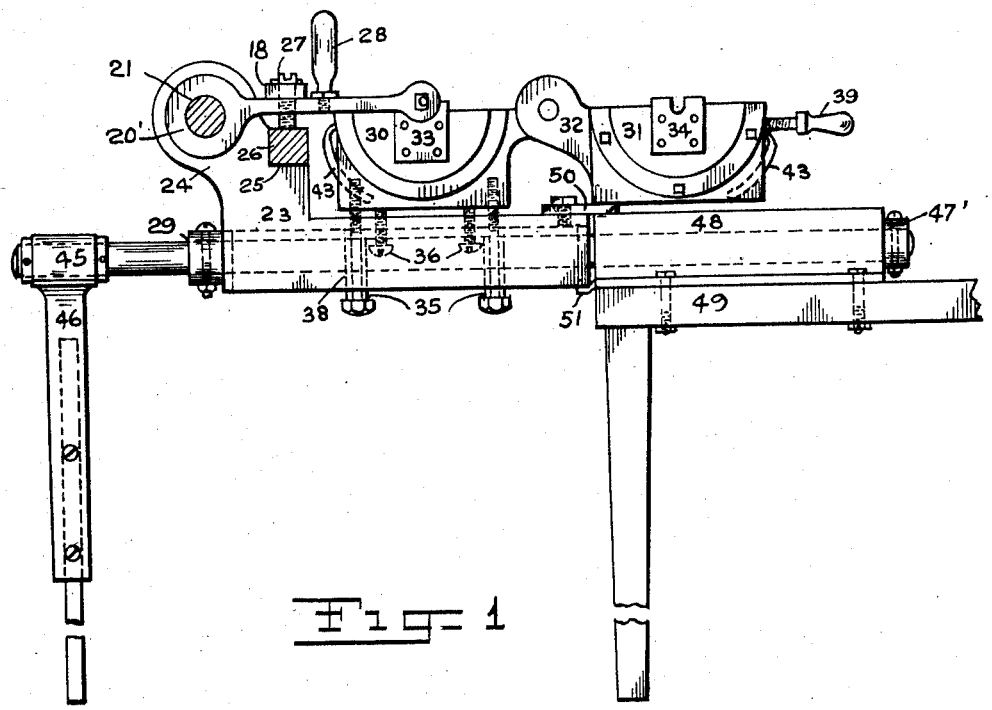
Figure 1 is an end elevation of the apparatus with the two part mold open and the mold and the parts connected to swing therewith in horizontal position.
Figure 2:
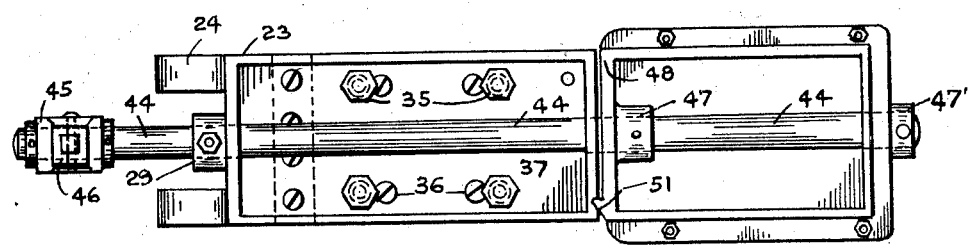
Figure 2 is an under side view of the mold and said parts shown in Fig. 1.
Figure 8:
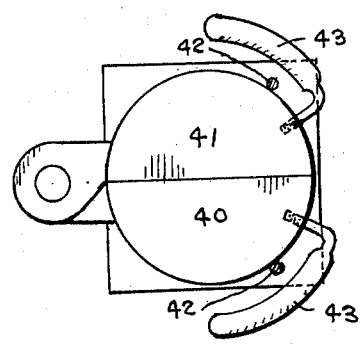
Figure 8 is a detail end view of operable head of mold.

The core rod 1, which may be assumed to be approximately three feet in length and one-half inch in diameter and which is composed of polished metal of accurately uniform shape and diameter throughout, is mounted on sliding brackets 2 and 3 at its ends. It will be understood that the metal of the rod is one having a much higher heat resistance than the glass, so that it will not soften under the heat of the glass. The brackets are arranged to be reciprocated to a sufficient extent to cause substantially the entire length of the rod to pass through the mold, and as the rod is exposed to the atmosphere during each reciprocation a part of the time its temperature will be slightly lower than that of the glass in the mold, but not sufficiently lower to cause any setting of the glass. This, however, will produce a slightly lower temperature in the glass immediately surrounding the rod, and give it a tendency to remain in position when the rod is removed.

One end of the rod 1 is clamped in the bracket 2 (see Fig. 7) by means of the clamping screw 4, engaging the plate 5 of the bracket 2 near one end, and the spring retracted clamping screws 7 engaging the same plate at a point removed therefrom, the end of the rod being received by a tapered recess 6 in the bracket end, and the plate and screws being raised when the screws are loosened by compression springs 8 in recesses 9 of the bracket end, so that the plate will automatically release the end of the rod. The screws are threaded into the outer part of the bracket. The opposite end of the rod has a flattened butt piece 1' thereon (see Figs. 4 to 6) and this is clamped in the chuck of the bracket 3 by means of a screw 10 passing through the said butt, and is held against lateral movement by the pin 11, passing through the hole 1'' of said butt. The chuck consists of the body 12, preferably square in cross section to prevent rotary motion, the extending end 13 carrying the dowel 11 and a threaded opening for the screw 10, the threaded shank 14 extending outwardly from the body and the sleeve 16 threaded on its outer part. The part 12 and the threaded shank adjacent thereto reciprocate in the hollow open bracket head 15, and between this head and the collar 16 a compression spring 17 is strung on the reduced portion 16' of the collar 16, so that a constant tension on the rod 1 is maintained. This insures against bending of the rod, maintains it in a straight, taut condition and also takes up any stretching of the rod due to expansion by the heat.

To remove the rod 1 from the mold it is only necessary to unscrew the binding screw or post 4 and permit the plate 5 to release its pointed end in the recess 6, then withdraw it therefrom and through the mold. The spring 17 will automatically accomplish the removal of the rod from the clamp in the end of the bracket 2, and the withdrawal of the rod from the mold may be accomplished by taking hold of the sleeve or cap 16 and drawing the rod back.

The brackets 2 and 3 are rigidly connected to the bar 18 by machine screws or other fastening means 19, 19' passed through the said bar and into the brackets, and have hinge eyes 20 and 20' through which the hinge rod 21 is passed. The bar 18 has similar hinge eyes 22, 22' at its ends through which the hinge bar also passes. In this manner the rod 1 with its connections and the brackets 2 and 3 are mounted to swing downward and forward and upward and backward to and from the mold when it is open, to position the rod in the mold and remove it therefrom. The main frame 23 of the machine has upstanding ring brackets 24, 24', through which the hinge bar 21 passes, and in this manner the hinge bar is supported and fixed to the frame, while the brackets 2 and 3 may swing thereon. On a ledge 25 of the brackets 24 a sill 26 is mounted, and an adjusting screw 27 passing through the bar 18 and threaded therein bears against this member 26 to support the brackets 2 and 3 and the rod 1 when the latter is in position in the mold. This screw also provides for the adjustment vertically of the rod 1 in the mold. The brackets 2 and 3 and their connecting bar 18 are similar in their construction and their relation to the rod 1 to the bracket and saw of a jigsaw, and a handle 28 on one of the brackets provides means for reciprocating it and the rod 1.

The mold shown in the drawings is similar in general form to that shown in the said copending application, and operates in substantially the same manner. It comprises the bottom and top mold parts 30 and 31 respectively hinged together at 32 and provided with small overlapping end plates 33 and 34 respectively having elongated axial apertures forming openings at the ends of the mold when closed, through which the rod 1 passes. The mold part 30 is secured to the horizontal or base portion of the frame 23 by means of bolts 35 passing through sleeve washers 38 and threaded in the bottom of said section, and other bolts 36 passing through a plate 37 secured to said frame and bearing against the bottom of the mold section. The bolts 35 also pass through this plate and bear against it through the sleeves. In this manner the mold section 30 is supported on its base and provided with means whereby it may be accurately adjusted and leveled, and secured in such position.

The head of the mold is constructed to be opened, and to that end is provided with a hinged closure consisting of segments 40 and 41 adapted to be opened and closed by handles 43, while the mold body is closed and the molded glass block still held therein. This provides for the opening of the head of the mold and the application of the puntee or blowing iron to the end of the molded block while it is still held in the mold. Any suitable form of openable head may be used, as the form does not involve the essence of the invention. The handles 42 have elongated shanks 42' and pass close to the head sections, the shank removably entering into the body of the mold to secure the head parts together, and is withdrawn when the head is to be opened. A handle 39 on the upper mold section 31 provides means for opening and closing the mold body.

Means for swinging the mold and its connected parts are provided in the shaft 44 journaled at one end in the sleeve 45 forming the top of the vertically adjustable post or support 46, passing through a fixed collar 29 of the frame 23 and having its opposite end passing through the sleeve 47 and into the collar 47', in the frame 48 secured to the supporting table 49. When the mold is in horizontal position, it and its frame or base are secured against movement in a vertical plane by a stop 50 mounted on a corner of the frame 23, so as to be swung out over the top of the frame 48, a stop 51 being provided to cooperate with it. When, however, the mold and its frame, and the other parts mounted thereon are to be swung to vertical position (see Fig. 3)—after the mold has been filled and closed—this stop is swung away from the frame 48, to release these parts, and permit them to pivot on the shaft 44. In this manner means for supporting the mold and connected parts in horizontal position while the mold is being filled, and means for then swinging it to vertical position so that its head can be opened and the blow pipe applied to the end of the molded block, are provided. It is also possible with this apparatus to fill the mold from its head, without opening the mold, after which the head may be closed and the core rod reciprocated while the mold is in a vertical or a horizontal position. This method can be followed where it is not desired to incorporate in the interior of the block light shields or backing members or other elements, and even, by the exercise of skill, where such elements are incorporated. The collars 29 and 47' are fixed to the shaft 44 and act as stop collars to prevent sliding movement of the mold frame on the shaft.

In operation the mold is first filled with molten glass and closed, or filled in a closed position, with the core rod in place in the mold, the rod then reciprocated until the bore of the block has been accurately formed and made permanent for the drawing and blowing operation. The mold is then swung to vertical position, if it has been filled in horizontal position, the core rod removed and the blowing iron or puntee applied to the end of the block. After this the mold is opened, the block removed and the stem and its bore drawn and blown in the manner well known in the art.

I claim:

1. The herein described method of making a glass stem or tube for thermometers and the like, which consists in placing glass in a plastic state in a mold having a greater diameter than the stem or tube to be produced, so as to form a stem block or blank, placing a rod of material having a higher heat resistance than the glass with its ends extending beyond the mold structure in the mold before it is filled and mounting it for movement therein to form a cylinder of glass with thick walls with the rod as a core reciprocating the rod in the glass and through the ends of the mold, then removing the rod and drawing the block or blank thus formed to the desired length.

2. The herein described method of making a glass stem or tube for thermometers and the like, which consists in placing glass in a plastic state in a mold having a greater diameter than the stem or tube to be produced, so as to form a stem block or blank, placing a rod of material having a higher heat resistance than the glass with its ends extending beyond the mold structure in the mold before it is filled and mounting it for movement therein, closing the mold after inserting the rod to form a cylinder of glass with thick walls with the rod as a core reciprocating the rod without removing it from the mold, then removing the rod and drawing the block or blank thus formed to the desired length.

3. The herein described method of making a glass stem or tube for thermometers and the like, which consists in placing glass in a plastic state in a mold having a greater diameter than the stem or tube to be produced, so as to form a stem block or blank, placing a rod of material having a higher heat resistance than the glass with its ends extending beyond the mold structure in the mold before it is filled to form a cylinder of glass with thick walls with the rod as a core, then moving the rod in the filled mold and through the same, then removing the rod and drawing the block or blank thus formed to the desired length.

4. The herein described method of making a glass stem or tube for thermometers and the like, which consists in placing glass in a plastic state in a mold having a greater diameter than the stem or tube to be produced, so as to form a stem block or blank, placing a rod of material having a higher heat resistance than the glass with its ends extending beyond the mold structure partly in the mold and partly beyond the same before it is filled to form a cylinder of glass with thick walls with the rod as a core, then moving the rod through the filled mold and completely through the plastic glass therein, then removing the rod and drawing the block or blank thus formed to the desired length.

5. The herein described method of making a glass stem or tube for thermometers and the like, which consists in placing glass in a plastic state in a mold having a greater diameter than the stem or tube to be produced, so as to form a segment of a stem block or blank, molding another segment in manner similar to the first segment and placing it on said first segment in a plastic state placing a rod of material having a higher heat resistance than the glass with its ends extending beyond the mold structure between the two segments, uniting the opposed surfaces of the segments to form a cylinder of glass with thick walls with the rod as a cord, then moving the rod through the filled mold, then removing the rod and drawing the block or blank thus formed to the desired length.

6. In a device of the character described a mold, a rod of much greater length than the mold adapted to be partly inserted therein, means exterior to said mold and at opposite ends thereof for supporting the rod, means for reciprocating said rod while in the mold and means connected therewith for maintaining a lengthwise tension on the rod.

7. In a device of the character described a mold comprising openable sections, a rod of greater length than the mold adapted to be inserted therein, means exterior to said mold for supporting the rod, means for reciprocating said rod while in the mold comprising a frame connected with said rod at points removed from said mold and a support for said frame on which it is mounted to oscillate with the rod to and from said mold.

8. In a device of the character described a mold comprising openable sections, a rod of greater length than the mold adapted to be inserted therein, means exterior to said mold for supporting the rod, means for reciprocating said rod while in the mold comprising a frame connected with said rod at points removed from said mold and a support for said frame on which it is mounted to oscillate with said rod.

9. In a device of the character described a mold comprising openable sections, a rod of greater length than the mold adapted to be inserted therein, means exterior to said mold for supporting the rod, means for reciprocating said rod while in the mold comprising a frame connected with said rod at points removed from said mold and a support for said frame on which it is mounted to reciprocate and oscillate with said rod.

10. In a device of the character described a mold comprising openable sections, a rod of greater length than the mold adapted to be inserted therein, means exterior to said mold for supporting the rod, means for reciprocating said rod while in the mold, said mold, rod and supporting means being mounted to rotate simultaneously from a substantially horizontal to an upright position.

11. In a device of the character described a mold comprising openable sections, a rod of greater length than the mold adapted to be inserted therein, means exterior to said mold for supporting the rod, means for reciprocating said rod while in the mold, said mold, rod and supporting means being mounted to rotate simultaneously from and substantially horizontal to an upright position and said means for reciprocating being constructed and arranged to be operable in both positions.

12. In a device of the character described a mold comprising openable sections, a rod of greater length than the mold adapted to be inserted therein, means exterior to said mold and beyond both ends thereof for supporting the rod, means for reciprocating said rod while in the mold, and a sectional openable head on said mold constructed and arranged to be opened or closed independently of the mold sections.

13. In a device of the character described a mold comprising openable sections, a rod of high heat resisting material adapted to be inserted therein while the sections are open, means exterior to said mold and beyond both ends thereof for supporting the rod, means for closing said mold while the rod is supported therein thereon and means for reciprocating said rod while in the mold.

14. In a device of the character described a mold having an openable end, a rod of high heat resisting material adapted to be inserted therein and removed therefrom while the end is closed, means exterior to said mold for supporting the rod and means for reciprocating said rod while in the mold and through its ends.

15. In a device of the character described a mold, a rod of high heat resisting material adapted to be inserted therein, means exterior to said mold for supporting the rod and holding it under tension a detachable connection between the rod and said supporting means and means for reciprocating said rod while in the mold.

16. In a device of the character described a mold, a rod of high heat resistance material adapted to be inserted therein, means exterior to said mold for supporting the rod and holding it under tension means for adjusting the tension on the rod and means for reciprocating said rod while in the mold.

17. The method of molding glass for drawn thermometer tubes which consists in placing a mass of molten glass in a mold, placing a rod or tube of rigid material in said mold so that it is embedded in such mass and extends through the mold, maintaining the rod at a lower temperature than the glass by exposing it to cooling fluid beyond both ends of the mold until the glass has formed around the rod and formed a bore in the mass, then removing the rod.

18. The method of molding glass for drawn thermometer tubes which consists in placing a rod or tube of rigid material in a hollow mold in such position that it extends beyond the same, depositing a mass of molten glass in the mold and causing it to surround and embed the rod, maintaining the rod at a temperature lower than the glass by reciprocating it through the mold and beyond the same until the glass has formed a bore conforming to the exterior surface of the rod, then removing the rod.

19. The herein described method of making a glass stem or tube for thermometers and the like, which consists in placing glass in a plastic state in a mold having a greater diameter than the stem or tube to be produced, so as to form a stem block or blank, placing a rod having more than double the length of the mold and made of material having a higher heat resistance than the glass partly in the mold and partly beyond the same before it is filled to form a cylinder of glass with thick walls with the rod as a core, then moving the rod through the filled mold and completely through the plastic glass therein in such a manner that all parts of the rod which are at any time within the mold are at times withdrawn therefrom, while maintaining a portion of the rod at all times in the bore, then removing the rod and drawing the block or blank thus formed to the desired length.

20. The herein described method of making a glass stem or tube for thermometers and the like, which consists in placing glass in a plastic state in a mold having a greater diameter than the stem or tube to be produced, so as to form a stem block or blank in a plastic state placing therein a rod of material having a higher heat resistance than the glass and having at least double the length of the mold to form a cylinder of glass with thick walls with the rod as a core, then moving the rod through the filled mold, so that portions of it are at times outside the mold and exposed to cooling influence, then removing the rod and drawing the block or blank thus formed to the desired length.

21. In a device of the character described a mold, a rod of more than double the length of the mold adapted to be inserted therein and to extend for at least half its length beyond the same, means exterior to said mold and at opposite ends thereof for supporting the rod and holding it beyond both ends of the mold and means for reciprocating said rod while in the mold.

22. The herein described method of making a glass stem or tube for thermometers and the like, which consists in placing glass in a plastic state in a mold having a greater diameter than the stem or tube to be produced, so as to form a stem, block or blank in a plastic state, placing therein a rod of material having a higher heat resistance than the glass and having substantially twice the length of the said block, and thus forming a cylinder of glass with thick walls with the rod as a core, then moving the rod through the filled mold, so that portions of it are at times outside the mold and exposed to cooling influence, then removing the rod and drawing the block or blank thus formed to the desired length.

Witness my hand this 28th day of March, 1930, county of New York, State of New York.

MAX E. MOELLER.